United States Patent Office 3,328,364
Patented June 27, 1967

3,328,364
NATURAL AND SYNTHETIC RUBBER COM-
POSITIONS CONTAINING POLYMERS OF
MERCAPTONITRILES
James N. Click and Rector P. Louthan, both of Bartles-
ville, Okla., assignors to Phillips Petroleum Company,
a corporation of Delaware
No Drawing. Filed May 28, 1964, Ser. No. 371,087
15 Claims. (Cl. 260—79.5)

This invention relates to natural and synthetic rubber compositions. In one aspect the invention relates to a method for improving the curing rate of natural and synthetic rubbers. In another aspect the invention relates to an improved accelerator for the vulcanization of natural and synthetic rubber compositions.

The vulcanization of natural rubbers and synthetic rubbers by the addition of sulfur is well known. It is also known that the addition of small amounts of materials known as accelerators may substantially reduce the required time for vulcanization. These accelerators' utility extends beyond their effect on the rate of vulcanization in that frequently marked improvements in quality also result from their use. However, although certain properties are improved other properties may be deleteriously affected.

It is an object of the invention to provide an accelerator which increases the rate of curing sulfur vulcanizable elastomers, either natural or synthetic.

It is another object of the invention to provide a novel rubber composition.

Yet another object of the invention is to provide a method for curing rubber compositions.

Other objects, advantages and features of the invention will be readily apparent to those skilled in the art from the following description and examples.

These objects are broadly accomplished by a novel composition prepared by incorporating in natural or synthetic vulcanizable elastomers a sufficient amount of a polymer of a mercaptonitrile to increase the rate of cure.

Various processes have been disclosed in the prior art for the preparation of mercapto-substituted nitriles. For example, the simple addition of hydrogen sulfide to unsaturated nitriles produces mercapto-substituted nitriles and the corresponding thioethers (sulfides). It has also been proposed that the mercapto-substituted nitriles can be readily produced in high yields and high purities by reaction of unsaturated nitriles with hydrogen sulfide in the presence of a catalytic amount of sulfur.

It has been found that by aging the mercapto-substituted nitriles at room temperature or by accelerated aging at elevated temperatures and/or in the presence of a basic material such as an amine, NaOH, and the like for a sufficient time to form a liquid or solid material, polymers are formed with are useful as primary or secondary accelerators in the compounding of natural or synthetic vulcanizable elastomers. For example, mercapto-substituted nitriles can be polymerized by maintaining the same at a neutral or basic pH (e.g., 7.0 to 13.0) and at 0 to 150° C. for a few minutes to several days. Longer polymerization times will be required at the lower temperatures and vice versa. If a basic material is added to obtain basic conditions for polymerization, shorter polymerization reaction times and lower polymerization temperatures can be employed. Any suitable base can be employed to provide a basic pH, such as ammonia, primary, secondary, and tertiary amines, and alkali and alkaline earth metal hydroxides. Representative bases which can be used for this purpose include methylamine, dimethylamine, triethylamine, isopyropylamine, pyridine, piperidine, sodium hydroxide, potassium hydroxide, rubidium hydroxide, cesium hydroxide, lithium hydroxide, calcium hydroxide, and the like.

Infrared and elemental analyses of the polymers of mercapto-substituted nitriles of this invention are consistent with the following general structural formula for these polymers

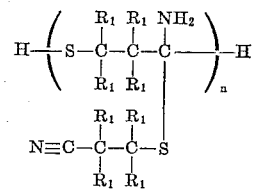

where $R_1$ is selected from the group consisting of hydrogen and alkyl hydrocarbon radicals having generally from 1 to 8 carbon atoms and preferably from 1 to 4 carbon atoms, and $n$ is an integer resulting in the polymer having a viscosity of at least 1 poise at 25° C. and preferably in the range of 1 to 1000 poises at 25° C. as measured by the Gardner-Holdt bubble tube method hereinafter described. Generally $n$ will be in the range of 2 to 100.

The polymer of 3-mercaptopropionitrile is presently preferred and can be represented by the formula

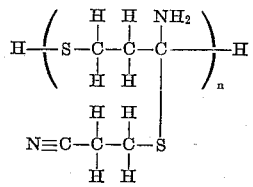

where $n$ is an integer as previously defined.

The mercapto-substituted nitriles which can be utilized as monomers for the polymers useful in accordance with the invention can be represented by the general formula

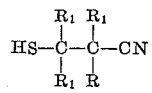

where $R_1$ is selected from the group consisting of hydrogen and alkyl hydrocarbon radicals having from generally 1 to 8 carbon atoms. In a presently preferred embodiment of the invention, $R_1$ is selected from the group consisting of hydrogen and alkyl hydrocarbon radicals having from 1 to 4 carbon atoms. For example, $R_1$ can be methyl, ethyl, propyl or butyl radicals and/or mixtures thereof. Examples of suitable monomers include 3-mercaptopropionitrile, 2-methyl-3-mercaptopropionitrile, 3 - methyl - 3 - mercaptobutyronitrile, 3 - t - butyl - 3-mercaptobutyronitrile, 2,3 - dimethyl - 3 - mercaptobutyronitrile, 3 - mercaptocapronitrile, 3 - mercaptoenanthonitrile, 3 - methyl - 2 - mercaptomethylvaleronitrile, 2 - n-propyl - 3 - mercaptovaleronitrile, 3 - methyl - 3 - mercaptovaleronitrile, 2,3 - di - n - butyl - 3 - mercaptoenanthonitrile, and the like. Other mercapto-substituted nitriles that can be used are 2,2-di-n-butyl-3-mercaptoundecanonitrile, 1 - cyano - 1,1 - dimethyl - 2 - n - hexyl - 2-mercapto - 4,5 - dimethyloctane, 1 - cyano - 1 - isooctyl-1 - n - heptyl - 2 - n - hexyl - 2 - mercapto - 4 - methylhexane, 1 - cyano - 1,1 - di - n - pentyl - 2 - isopropyl - 2-mercaptoheptane, and the like.

The mercapto-substituted nitriles which can be utilized as the monomer for the polymers useful in accordance with the invention can be prepared by known processes, but we prefer to prepare these mercapto-substituted nitriles by reaction of an unsaturated nitrile with hydrogen sulfide in the presence of a catalytic amount of sulfur.

Representative nitriles which can be reacted with $H_2S$ to give the corresponding mercapto-substituted saturated nitriles and subsequently polymerized include: acrylonitrile, 2-methylacrylonitrile, 2-butenenitrile, 3-methyl-3-butenenitrile, 2,3-dimethyl-2-butenenitrile, 2-hexenenitrile, 2-heptenenitrile, 4-methyl-2-hexenenitrile, 2-n-propyl-2-pentenenitrile, 3-methyl-2-pentenenitrile, 2,3-di-n-butyl-2-heptenenitrile, 2-butene-1,4-dinitrile, 2-methyl-2-butene-1,4-dinitrile, 2-ethyl-2-butene-1,4-dinitrile, 2,3-dimethyl-2-butene-1,4-dinitrile, 2-isopropyl-3-tert-butyl-2-butene-1,4-dinitrile, 2,3-di-n-butyl-2-butene-1,4-dinitrile, and the like, including mixtures thereof.

A preferred polymer is poly-3-mercaptopropionitrile prepared by aging for 3 weeks at room temperature 3-mercaptopropionitrile prepared by the reaction of $H_2S$ with acrylonitrile.

The reaction of the hydrogen sulfide with the unsaturated nitriles in the presence of a catalytic amount of sulfur can also be carried out in the presence of a catalytic amount of a weak organic base. Such weak organic bases have ionization constants of less than $1 \times 10^{-5}$. Representative weak organic bases which can be used include pyridine, aniline, 2-methyl-5-ethylpyridine, N-methylpyrrolidone, bis(dimethylamino)disulfide, acetamide, acetanilide, aniline, anthranilic acid, benzylamine, diethylbenzylamine, dimethylbenzylamine, ethylenediamine, para-toluidine, trimethylamine, and the like. Generally, for most preparations of such products the amount of the sulfur to be used will usually be in the range of 0.1 to 5 grams per mol, preferably 0.5 to 2 grams per mol, of the unsaturated nitrile reactant charged to the reaction zone. Where an organic base is used in addition to the sulfur, the amount of such weak base which generally can be used will usually be in the range of 0.1 to 5 grams, preferably 0.5 to 2 grams per mol, of the nitrile charged to the reaction zone. The reaction temperature can vary over a wide range, and generally will be in the range of 0 to 150° C., preferably 25 to 100° C. The amount of hydrogen sulfide used can vary widely, but generally will be in the range of 1 to 4 mols per mol, preferably about 2 mols per mol, of the unsaturated nitrile reactant. The reaction can be carried out in a closed system and the pressure in the reaction zone generally will be the autogenous pressure developed at the specified temperatures, such pressures being in the range of 100 to 1,000 p.s.i.g. The reaction time can also vary; generally the reaction time will be in the range of 0.1 to 20 hours, usually 0.25 to 5 hours.

The above-described reaction of hydrogen sulfide with the unsaturated nitrile compounds can be carried out in the presence of solvents or diluents, preferably polar organic diluents such as alcohols, amides, sulfoxides, sulfones and saturated nitriles. For example, diluents such as methyl alcohol, ethyl alcohol, dimethyl sulfoxide, sulfolane and acetonitrile can be used. Where such diluents are employed, the weight ratio of diluent to unsaturated nitrile reactant is generally not greater than 3:1.

After reaction is completed to the desired degree, the mercapto-substituted nitrile products can be recovered from the reaction mixture by well-known procedures. For example, gases can be vented, recovered and recycled if desired, and the product distilled, extracted, crystallized or subjected to various other separation or recovery procedures to obtain the desired sulfur compound. In the usual recovery process, the reaction mixture will be flashed, the vaporized mercapto-substituted nitrile condensed, and the condensed product distilled to obtain the highly pure mercapto-substituted nitrile in high yields.

The polymers of the aforementioned mercapto-substituted nitriles, such as poly-3-mercaptopropionitrile, range from liquid to solid but preferably have a viscosity in the range of 1 to 1000 poises as measured by the Gardner-Holdt bubble tube method as described in "Physical and Chemical Examination of Paints, Varnishes, Lacquers and Colors," page 495, Henry A. Gardner, 6th ed., October 1933, distributed by Institute of Paint and Varnish Research, 2201 New York Ave., N.W., Washington, D.C. Preferably, these polymers are prepared by aging the mercaptonitrile from 1 day to 10 weeks, more preferably 1 week to 6 weeks, at room temperature or the equivalent under accelerated conditions.

This invention can be employed advantageously in the vulcanization by sulfur of an unsaturated vulcanizable elastomer, either natural or synthetic. Preferred natural and synthetic elastomers include caoutchouc, balata, homopolymers of conjugated dienes having from 4 to 8 carbon atoms per molecule, copolymers of mixtures of said conjugated dienes, and polymers having a major amount of conjugated diene and a minor amount of a copolymerizable monomer containing a $CH_2=C<$ group. Examples of said synthetic elastomers are polybutadiene, polyisoprene, butadiene-styrene copolymers, butadiene-methylvinylpyridine copolymers, butadiene-acrylonitrile copolymers, polychloroprene and various other vulcanizable solid or semi-solid conjugated diene polymers and copolymers. Particularly preferred synthetic elastomers are the emulsion polymerized butadiene-styrene rubbers such as those described in ASTM D1419–61T, the solution polymerized butadiene-styrene rubbers as described in U.S. 2,975,160 and the polydiene rubbers having a high proportion of cis-1,4-configuration which have recently been produced by a number of methods. The preferred cis-1,4-polybutadiene contains at least 75 percent and up to 100 percent, preferably 85 to 98 percent or higher, of the polymer units formed by cis-1,4-addition, the remainder of the polymer being formed by trans-1,4- and 1,2-addition. The preferred cis-polyisoprene is one in which at least 75 percent and up to 100 percent, preferably 85 to 95 percent or higher, of the polymer units is formed by cis-1,4-addition, the remainder being formed by trans-1,4-, 3,4-, and 1,2-addition.

The compounding of natural and synthetic rubber frequently involves the addition of a large and varied group of materials, each of which performs a particular function, either singly or in combination with the remaining compounding ingredients. Any of the standard sulfur-type compounding recipes used for synthetic or natural rubber are applicable for the invention. In addition, the polymer of mercaptonitrile can be used in conjunction with other accelerators.

The optimum cure from the practical standpoint is that state of cure which gives the best balance of physical properties. This is not necessarily the time at which any one particular physical property reaches a desirable plateau. For example, modulus is a completely satisfactory criterion of state of cure for particular polymers. However, modulus is not satisfactory in the comparison of polymers having widely varied Mooney viscosity. Other methods of determining the state of cure utilize criteria such as hardness, tensile, elongation, temperature build-up, tear resistance, permanent set, cut growth resistance, speed of retraction, the amount of combined or free sulfur and the like.

While the preferred vulcanizing agent used in this invention is elemental sulfur, sulfur donors can also be used. Suitable sulfur donors or other vulcanizing agents include thiuram polysulfides, selenium dithiocarbamates, N,N'-polythiodiamines, and the like. When using such materials, it should be taken into consideration that these sulfur donors frequently perform the function of both a vulcanizing agent and a vulcanizing accelerator.

The selection of the curing temperature must take into consideration the effect of the temperature on the physical properties of the ultimate product. For instance, as the state of cure increases, modulus, resilience, abrasion resistance, speed of retraction, and the like, generally increase while physical properties such as ultimate elongation, permanent set, flex life, cut growth, and swelling in solvents generally decrease for butadiene-styrene rubbery copolymers. However, such factors as tensile strength and tear resistance frequently increase to a maximum and then decrease with increased state of cure. Therefore, it is necessary in the selection of the optimum temperature to choose the temperature at which the optimum properties are acquired. I have found that when the elastomer is cis-1,4-polybutadiene, natural rubber, cis-polyisoprene, or mixtures thereof, that the preferred temperature is in the range of 225° to 330° F., preferably 270° to 310° F.

Generally, the higher the dosage of the accelerator the faster the cure rate although the change produced by increased increments of accelerator becomes smaller and smaller. There are several exceptions to this rule. In selecting the concentration of the accelerator, the other compounding materials present must also be considered. For instance, with an acidic type of pigment such as channel black, a higher accelerator concentration must be used in order to obtain the same cure rate as would be obtained with basic pigments or in the absence of any pigment thereof. The amount of sulfur or sulfur donor used as well as the amount of the polymercaptonitrile is variable within a broad range. Preferably the amount of the polymercaptonitrile employed is in the range of about 0.1 to 20, preferably 1 to 10, parts by weight per 100 parts by weight of the rubber to be vulcanized. The amount of sulfur is preferably in the range of about 1 to about 3 parts by weight per 100 parts of rubber.

A number of additives are employable to modify the final product. Generally, the compounding recipes include reinforcing or mineral fillers such as carbon blacks, silica, titanium dioxide, calcium silicate, hydrated alumina, or calcium carbonate, and the like. A plasticizer may be also present, but is not mandatory, and includes aromatic hydrocarbons such as aromatic extract oils, saturated and unsaturated hydrocarbons, rosin, mineral, rubber, coumarone-indene resins, and esters such as dibutyl phthalate and tricresyl phosphate. It is sometimes desirable to add metallic oxides, such as zinc oxide, magnesium oxide, litharge and the like, either alone or in conjunction with fatty acids such as stearic acid.

When operating in accordance with the practice of this invention, it is preferred that the reinforcing agent or filler be dried prior to incorporating it into the rubber with the polymercaptonitrile being added subsequently. The compositions are generally vulcanized soon after the mixing is completed. It is frequently advantageous to employ a metal oxide such as zinc oxide, magnesium oxide or the like along with the sulfur, polymercaptonitrile and other compounding ingredients in order to minimize evolution of hydrogen sulfide during vulcanization. The metal oxide greatly reduces or eliminates the odor developed by the hydrogen sulfide and also minimizes formation of bubbles in the stock.

The invention is best illustrated by the following examples:

The monomer used in the following examples was prepared by charging about 12 moles of acrylonitrile and about 12 gms. of sulfur to a one-gallon stainless steel, stirred autoclave equipped with an internal steam coil and water jacket for maintaining the reaction temperature at the desired level. The reactor was then closed and pressured with about 2 moles of hydrogen sulfide per mol of acrylonitrile, after which the reaction mixture was heated to about 85° C. and maintained at such temperature until the reaction was completed. The reaction mixture was then blown down hot from the autoclave and the resulting 3-mercaptopropionitrile was flashed from the hot reaction mixture. The sample of the distilled 3-mercaptopropionitrile boiled at 70° C. at 5 mm. Hg absolute pressure and had a refractive index $n_D^{20}$ of 1.4866. The 3-mercaptopropionitrile was then aged for 3 weeks at room temperature. The polymer had a viscosity of 150 poises.

*Example I*

A high-cis-polybutadiene rubbery polymer was prepared by polymerizing 1,3-butadiene in toluene with a triisobutylaluminum-titanium tetrachloride-iodine catalyst, shortstopping with a disproportionated rosin, steam-stripping, water-washing, and drying. Polymer properties were:

Cis content (j) _____ percent __ 94.9
Trans content (j) _____ do ____ 2.0
Vinyl content (j) _____ do ____ 3.1
Inherent viscosity (k) _____ 2.53
Mooney (ML-4 @ 212° F.) (l) _____ 44.5

(j), (k), (l).—See notes following Table IV.

The polybutadiene was then mixed in a standard sulfur compounding recipe. One part of the polybutadiene was cured by heating with poly-3-mercaptopropionitrile which was prepared by aging for 3 weeks at room temperature 3-mercaptopropionitrile prepared by the reaction of $H_2S$ and acrylonitrile in the presence of a catalytic amount of S. The other part of the polybutadiene was cured by heating with NOBS Special, a conventional accelerator. The results are tabulated in the following Table I.

TABLE I

| | A | B |
|---|---|---|
| High-cis-Polybutadiene | 100 | 100 |
| IRB #1 (a) | 50 | 50 |
| Zinc Oxide | 3 | 3 |
| Stearic Acid | 2 | 2 |
| Flexamine (b) | 1 | 1 |
| Philrich 5 (c) | 10 | 10 |
| Sulfur | 1.75 | 1.75 |
| NOBS Special (e) | 1.05 | |
| Poly-3-mercaptopropionitrile | | 8 |
| Properties After 30-Minute Cure at 307° F. | | |
| 300% Modulus, p.s.i. (f) | 1,090 | 770 |
| Tensile, p.s.i. (f) | 2,330 | 2,470 |
| Elongation, percent (f) | 475 | 610 |
| Δ T, ° F. (g) | 46.6 | 50.0 |
| Resilience, percent (h) | 75.8 | 71.9 |
| Shore Hardness (i) | 62.5 | 56.0 |
| Aged 24 Hours at 212° F. | | |
| 300% Modulus, p.s.i. (f) | | 1,375 |
| Tensile, p.s.i. (f) | 1,530 | 2,180 |
| Elongation, percent (f) | 255 | 420 |
| Δ T, ° F. (g) | 39.2 | 48.2 |
| Resilience, percent (h) | 80.7 | 71.8 |

(a), (b), (c), (e), (f), (g), (h), (i)—See notes at end of specification.

It is apparent from the data in Table I that the accelerator of this invention improved the elongation, hardness and tensile properties of the high-cis-polybutadiene.

*Example II*

The procedure of Example I was followed using a random copolymer containing 75 percent butadiene and 25 percent styrene prepared by polymerizing the two monomers with a butyllithium catalyst at a temperature of about 120° F. in hexane containing 1 phm. (part per 100 parts of monomers) tetrahydrofuran randomizing agent and 0.08 phm. divinylbenzene branching agent, shortstopping with a fatty acid, steam-stripping, water-washing, and drying. Polymer properties were:

Cis content (j) _____ percent __ 24.0
Trans content (j) _____ do ____ 50.5
Vinyl content (j) _____ do ____ 25.5
Inherent viscosity (k) _____ 1.68
Mooney (ML-4 @ 212° F.) (l) _____ 52.5

(j), (k), (l).—See notes at end of specification.

The results are tabulated in Table II.

TABLE II

|  | C | D |
|---|---|---|
| Soln-polymerized Bd-Sty | 100 | 100 |
| IRB #1 (a) | 50 | 50 |
| Zinc Oxide | 3 | 3 |
| Stearic Acid | 2 | 2 |
| Flexamine (b) | 1 | 1 |
| Philrich 5 (c) | 10 | 10 |
| Sulfur | 1.75 | 1.75 |
| Santocure (d) | 1.0 | |
| Poly-3-mercaptopropionitrile | | 8 |
| *Properties After 30-Minute Cure at 307° F.* | | |
| 300% Modulus, p.s.i. (f) | 1,440 | 1,450 |
| Tensile, p.s.i. (f) | 3,160 | 3,130 |
| Elongation, percent (f) | 530 | 535 |
| Δ T, ° F. (g) | 60.1 | 50.6 |
| Resilience, percent (h) | 64.6 | 67.0 |
| Shore Hardness (i) | 64.0 | 62.0 |
| *Aged 24 Hours at 212° F.* | | |
| 300% Modulus, p.s.i. (f) | 2,095 | 2,440 |
| Tensile, p.s.i. (f) | 2,845 | 2,840 |
| Elongation, percent (f) | 375 | 335 |
| Δ T, ° F. (g) | 54.0 | 51.2 |
| Resilience, percent (h) | 69.5 | 66.1 |

(a), (b), (c), (d), (f), (g), (h), (i)—See notes at end of specification.

It is apparent from the data in Table II that the polymer of mercaptonitrile improved the heat build-up and hardness of the rubber.

Example III

The procedure of Example I was followed with a butadiene-styrene copolymer (SBR–1500) prepared in an emulsion system at 41° F. in the presence of rosin acid soap. The results are as follows:

TABLE III

|  | E | F | G | H |
|---|---|---|---|---|
| SBR–1500 | 100 | 100 | 100 | 100 |
| IRB #1 (a) | 50 | 50 | 50 | 50 |
| Zinc Oxide | 3 | 3 | 3 | 3 |
| Stearic Acid | 1 | 1 | 1 | 1 |
| Flexamine (b) | 1 | 1 | 1 | 1 |
| Philrich 5 (c) | 10 | 10 | 10 | 10 |
| Sulfur | 1.75 | 1.75 | 1.75 | 1.75 |
| Santocure (d) | 1.20 | | 1.20 | |
| Poly-3-mercaptopropionitrile | | 8 | | *8 |
| *Properties After 30-Minute Cure at 307° F.* | | | | |
| 300% Modulus, p.s.i. (f) | 1,490 | 1,375 | 1,420 | 1,480 |
| Tensile, p.s.i. (f) | 3,830 | 3,600 | 3,150 | 3,400 |
| Elongation, percent (f) | 595 | 610 | 520 | 570 |
| Δ T, ° F. (g) | 63.7 | 61.6 | 61.8 | 56.1 |
| Resilience, percent (h) | 60.4 | 59.5 | 63.7 | 65.4 |
| Shore Hardness (i) | 64.0 | 61.5 | 59.0 | 60.0 |

| *Aged 24 Hours at 212° F.* | | |
|---|---|---|
|  | E | F |
| 300% Modulus, p.s.i. (f) | 2,480 | 2,020 |
| Tensile, p.s.i. (f) | 3,375 | 3,430 |
| Elongation, percent (f) | 390 | 470 |
| Δ T, ° F. (g) | 57.1 | 56.8 |
| Resilience, percent (h) | 66.5 | 61.9 |

(a), (b), (c), (d), (f), (g), (h), (i)—See notes at end of specification.

*This polymer was prepared by the same method as previously described for the polymer used in all the examples but was prepared at a different time. The viscosity, as determined by the Gardner-Holdt method, was 150 poises.

It is apparent that the accelerator of this invention improved the heat build-up, hardness and elongation of the rubber.

Example IV

The procedure of Example I was followed with a butadiene-styrene copolymer (SBR–1500) prepared in an emulsion system at 41° F. in the presence of rosin acid soap. The results are as follows:

TABLE IV

|  | Parts by Weight | |
|---|---|---|
| Run Number | I | J |
| SBR 1500 | 100 | 100 |
| IRB #1 (a) | 50 | 50 |
| Zinc Oxide | 3 | 3 |
| Stearic Acid | 1 | 1 |
| Flexamine (b) | 1 | 1 |
| Sulfur | 1.75 | 1.75 |
| Santocure (d) | 1.20 | 1.20 |
| 3-Mercaptopropionitrile | 10 | |
| Poly-3-mercaptopropionitrile | | 10 |
| *Properties After 30-Minute Cure at 307° F.* | | |
| 300% Modulus, p.s.i. (f) | | 1,465 |
| Tensile, p.s.i. (f) | 135 | 3,760 |
| Elongation, percent (f) | 720 | 570 |
| Δ T, ° F. (g) | (*) | 63.6 |
| Resilience, percent (h) | 44.5 | 59.2 |
| Shore Hardness (i) | 52 | 63 |
| *Aged 24 Hours at 212° F.* | | |
| 300% Modulus, p.s.i. (f) | 480 | **2,390 |
| Tensile, p.s.i. (f) | 935 | 3,500 |
| Elongation, percent (f) | 590 | 415 |
| Δ T, ° F. (g) | (*) | 60.7 |
| Resilience, percent (h) | 48.2 | 63.3 |

(a), (b), (d), (f), (g), (h), (i)—See notes at end of specification.
*Too soft to run.
**Estimated.

It is apparent that the polymer is a vulcanization accelerator whereas the monomer is not.

NOTES (a) A high-abrasion furnace black.

(b) A physical mixture of a complex diarylamine-ketone reaction product (65%) and N,N'-diphenyl-p-phenylenediamine (35%).

(c) A highly aromatic rubber extender and process oil.

(d) N-cyclohexyl-2-benzothiazole sulfenamide.

(e) N-oxydiethylene-2-benzothiazyl sulfenamide.

(f) ASTM D412–61T. Scott tensile machine L–6, 80° F.

(g) ASTM D623–58. Method A, Goodrich Flexometer; 143 lb./sq. in. load, 0.175-inch stroke. Test specimen is a right circular cylinder 0.7 inch in diameter and 1 inch high.

(h) ASTM D945–59 (modified). Yerzley oscillograph. Test specimen is a right circular cylinder 0.7 inch in diameter and 1 inch high.

(i) ASTM D676–59T. Shore durometer, type A.

(j) The percentage of polymer formed by cis-1,4-addition, trans-1,4-addition, and 1,2-addition (vinyl) was determined by dissolving the polymer in carbon disulfide to form a solution having 25 grams of polymer per liter of solution, and then determining the infrared spectrum (percent transmission) of the solution. The percent of the total unsaturation present in trans-1,4- was calculated according to the following equation and consistent units: $\epsilon = E/tc$ where $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction was determined at the 10.35 micron band and the extinction coefficient was 146 (liters-mols$^{-1}$-centimeters$^{-1}$). The percent of the total unsaturation present as 1,2- (or vinyl) was calculated according to the above equation, using the 11.0 micron band and an extinction coefficient of 209 (liters-mols$^{-1}$-centimeters$^{-1}$). The percent of the total unsaturation present as cis-1,4- was obtained by subtracting the trans-1,4- and 1,2- (vinyl) determined according to the above procedure from the theoretical unsaturation, assuming one double bond per each $C_4$ unit in the polymer.

(k) This type of viscosity determination is made on polymers ranging from liquid to rubbery consistency. For diene homopolymers and diene-vinyl-substituted aromatic copolymers inherent viscosities of less than about 0.3 are indicative of liquid polymers; those above about 0.3 and below about 1.5 are indicative of soft materials, sometimes designated as "semi-liquid" or "semi-solid"; and those above about 1.5 are indicative of rubbery polymers. For vinyl-substituted aromatic homopolymers inherent viscosities of greater than about 0.2 are indicative of solid materials.

(1) ASTM D1646–61.

It is apparent that using a compound of my invention as an accelerator with the three different types of rubber listed resulted in consistently lower hardness, in equal or greater tensile strength, and—in most cases—in an improvement in elongation and temperature build-up.

While certain examples, structures, composition and process steps have been described for purposes of illustration, the invention is not limited to these. Variation and modification within the scope of the disclosure and the claims can readily be effected by those skilled in the art.

We claim:

1. A composition of matter comprising a sulfur vulcanizable elastomer, a vulcanizing agent and a polymercaptonitrile having the following structural formula:

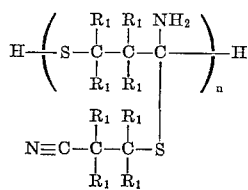

where $R_1$ is selected from the group consisting of hydrogen and alkyl hydrocarbon radicals having from 1 to 8 carbon atoms, and $n$ is an integer resulting in the polymer having a viscosity of at least 1 poise at 25° C. as measured by the Gardner-Holdt bubble tube method.

2. A composition of matter comprising a sulfur vulcanizable elastomer, a vulcanizing agent selected from the group consisting of elemental sulfur and a sulfur donor, and a polymercaptonitrile having the following structural formula:

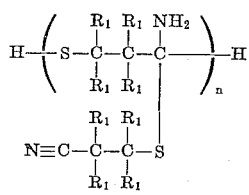

where $R_1$ is selected from the group consisting of hydrogen and alkyl hydrocarbon radicals having from 1 to 4 carbon atoms, and $n$ is an integer in the range of 2 to 100.

3. The composition of claim 2 wherein said elastomer comprises a polymer of a conjugated diene having from 4 to 8 carbon atoms per molecule.

4. The composition of claim 2 wherein each of said $R_1$'s is hydrogen.

5. A composition of matter comprising a sulfur vulcanizable elastomer selected from the group consisting of natural rubber, synthetic rubber and mixtures thereof, from 1 to 3 parts by weight per 100 parts rubber of sulfur, and from 0.1 to 20 parts by weight per 100 parts rubber of a polymercaptonitrile having the following structural formula:

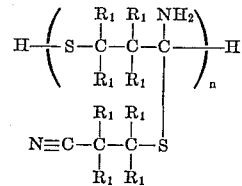

where $R_1$ is selected from the group consisting of hydrogen and alkyl hydrocarbon radicals having from 1 to 8 carbon atoms, and $n$ is an integer resulting in the polymer having a viscosity of at least 1 poise at 25° C. as measured by the Gardner-Holt bubble tube method.

6. The composition of claim 5 wherein said synthetic rubber comprises a polymer of a conjugated diene having from 4 to 8 carbon atoms per molecule.

7. The composition of claim 5 wherein said synthetic rubber comprises a copolymer of butadiene and styrene.

8. The composition of claim 5 wherein each of said $R_1$'s is hydrogen.

9. The composition of claim 8 wherein said polymer is prepared by aging 3-mercaptonitrile at room temperature for 1 day to 10 weeks.

10. A process for increasing the rate of cure of a sulfur vulcanizable elastomer comprising intimately admixing said elastomer, a vulcanizing agent, and a polymercaptonitrile having the following structural formula:

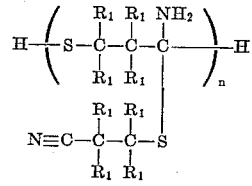

where $R_1$ is selected from the group consisting of hydrogen and alkyl hydrocarbon radicals having from 1 to 8 carbon atoms, and $n$ is an integer resulting in the polymer having a viscosity of at least 1 poise at 25° C. as measured by the Gardner-Holdt bubble tube method.

11. The process of claim 10 wherein each of said $R_1$'s is hydrogen.

12. The process of claim 10 wherein said elastomer comprises a polymer of 1,3-butadiene.

13. The process of claim 10 wherein said elastomer comprises a copolymer of butadiene and styrene.

14. A process for increasing the rate of cure of a sulfur vulcanizable elastomer selected from the group consisting of natural rubber, synthetic rubber and mixtures thereof comprising intimately admixing said elastomer, sulfur and between about 0.1 to about 20 parts by weight per 100 parts of rubber of a polymer of a mercaptonitrile having the following structural formula:

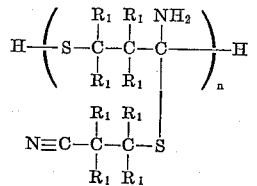

where $R_1$ is selected from the group consisting of hydrogen and alkyl hydrocarbon radicals having from 1 to 8 carbon atoms, and *n* is an integer resulting in the polymer having a viscosity of at least 1 poise at 25° C. as measured by the Gardner-Holdt bubble tube method, and subjecting said admixture to curing conditions.

15. The process of claim 14 wherein said polymer is prepared by aging said mercaptonitrile for 1 to 6 weeks at room temperature.

References Cited
UNITED STATES PATENTS
3,133,955   5/1964   Relyea _____ 260—79.5

JOSEPH L. SCHOFER, *Primary Examiner.*

D. K. DENENBERG, *Assistant Examiner.*